United States Patent [19]
Horie

[11] Patent Number: 5,182,737
[45] Date of Patent: Jan. 26, 1993

[54] SYSTEM FOR READING OPTICAL RECORDING MEDIUM USING REFERENCE LINERS WHICH ARE POSITIONED PERPENDICULAR TO DATA TRACKS

[75] Inventor: Kiyoshi Horie, Kanagawa, Japan
[73] Assignee: Kabushiki Kaisha CSK, Tokyo, Japan
[21] Appl. No.: 490,632
[22] PCT Filed: Sep. 20, 1989
[86] PCT No.: PCT/JP89/00955
§ 371 Date: May 17, 1990
§ 102(e) Date: May 17, 1990

[30] Foreign Application Priority Data

Sep. 20, 1988 [JP] Japan .................. 63-235524

[51] Int. Cl.⁵ ............................. G11B 7/00
[52] U.S. Cl. ................................. 369/47
[58] Field of Search ............. 369/47, 48, 59, 44.26; 235/494, 487

[56] References Cited

U.S. PATENT DOCUMENTS 4,855,981 8/1989 Kimura et al. ................ 369/47

FOREIGN PATENT DOCUMENTS 61-168130 7/1986 Japan .
61-192075 8/1986 Japan .
61-246930 11/1986 Japan .

Primary Examiner—Robert A. Weinhardt
Assistant Examiner—Nabil Hindi
Attorney, Agent, or Firm—Lackenbach Siegel Marzullo & Aronson

[57] ABSTRACT

The present invention relates to system for reading an optical recording medium having a data region formed by arranging, in parallel, a plurality of data tracks each of which is constituted by a plurality of bits along a reference line positioned perpendicular to the data tracks enabling the recording capacity of the optical recording medium to be enlarged. A bit included in the data track and positioned adjacently to the reference line is arranged to be a clock bit. A reading portion is provided with a counter for generating a clock window on the basis of a read signal of the data track; an AND circuit for calculating the logical product of the clock window and the read signal of the clock bit in the present data region and generating a true clock pulse or a dummy clock pulse; a counter for converting the dummy clock pulse into the timing of the true clock pulse in the case of the dummy clock pulse; a counter for generating a data window on the basis of the true clock pulse; and an AND circuit for calculating the logical product of the data window and the read signal so as to make the logical product to be data. Even if the number of the reference line in the optical recording medium is reduced to one, data can be correctly read so that the data recording capacity can be significantly enlarged.

5 Claims, 4 Drawing Sheets

SYSTEM FOR READING OPTICAL RECORDING MEDIUM USING REFERENCE LINERS WHICH ARE POSITIONED PERPENDICULAR TO DATA TRACKS

BACKGROUND OF THE INVENTION

The present invention relates to a system for reading an optical recording medium having a data region formed by arranging, in parallel, a plurality of data tracks each of which is constituted by a plurality of bits along reference lines which are perpendicular to the data tracks.

BACKGROUND ART

In an optical recording medium having a data region formed by arranging, in parallel, a plurality of data tracks each of which is constituted by a plurality of bits along reference lines which are perpendicular to the data tracks, two reference lines are provided and their interval is arranged to be larger than the interval between other data bits so that the reference lines can be easily distinguished from the data bits in a read signal.

A data reading apparatus for reading data from the optical recording medium of the type described above performs the reading operation and identifies the data bits with reference to the positions of the above-described reference lines.

However, the above-described conventional optical recording medium suffers from a poor recording capacity since it has the above-described two reference lines having a large interval in each of the data regions thereof.

If the interval between the reference lines is reduced or the number of the reference line is decreased by one for the purpose of enlarging the recording capacity, the identification of the reference line becomes unstable, causing a problem in terms of the reliability of the reading apparatus.

DISCLOSURE OF THE INVENTION

Accordingly, it is an object of the present invention to provide a reading system with which the capacity of the optical recording medium can be enlarged.

In order to achieve the above-described object, according to the present invention, there is provided a system for reading an optical recording medium having a data region formed by arranging, in parallel, a plurality of data tracks each of which is constituted by a plurality of bits along a reference line positioned perpendicular to the data tracks, the system for reading an optical recording medium being characterized by a reading portion having: a bit included in the data track and positioned adjacently to the reference line and arranged to be a clock bit; a counter for generating a clock window on the basis of a read signal of the data track; an AND circuit for calculating the logical product of the clock window and the read signal of the clock bit in the present data region and generating a true clock pulse or a dummy clock pulse; a counter for converting the dummy clock pulse into the timing of the true clock pulse in the case of the dummy clock pulse; a counter for generating a data window on the basis of the true clock pulse; and an AND circuit for calculating the logical product of the data window and the read signal so as to make the logical product to be the data.

As a result of the above-described structure, even if the number of the reference lines in the optical recording medium is decreased to one, data can be correctly read so that the data recording capacity can be significantly enlarged.

According to other aspects of the present invention, the interval between the clock bit and the reference line is arranged to be different from intervals between other bits and the clock bits are formed on alternate data tracks, or a counter for generating an upper window for displaying the difference between the present data region and the neighboring data region is included therein.

Furthermore, the clock windows are generated at the same intervals between the reference lines and the clock bits, or the data windows are generated at the same intervals between the data bits.

BEST MODE FOR CARRYING OUT THE INVENTION

Figure 3:
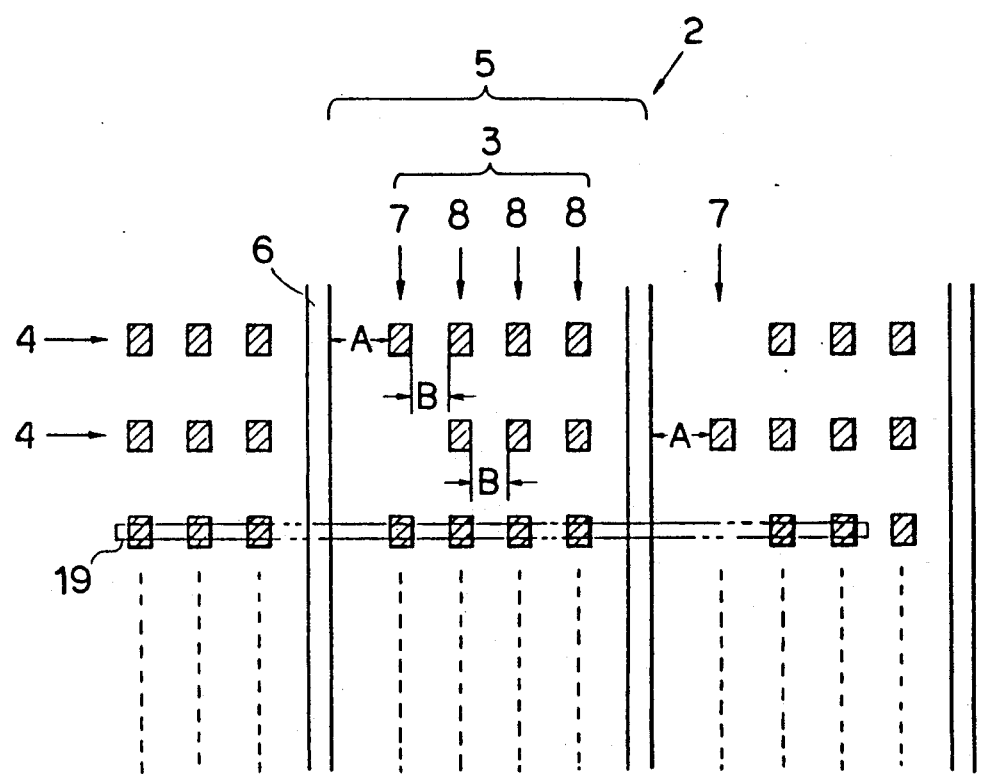
FIG. 3 is an enlarged view which illustrates an essential portion of the optical recording medium.

First, the structure of an optical recording medium for performing a reading operation by using a system for reading an optical recording medium according to this embodiment is shown in FIG. 3. Bands 5 are formed in a data region 2 of an optical recording medium 1 by longitudinally arranging data tracks 4 each of which is constituted by the columns of bits 3, a multiplicity of the 5 thus formed bands 5 being arranged in parallel. Reference lines 6 for detecting the bits 3 are each formed on the left of the bands 5 when viewed in the drawing.

Bits, among the bits 3 in the data tracks 4, positioned adjacently to the reference lines 6 are arranged to be clock bits 7, while other bits 3 are arranged to be data bits 8. An interval A between the reference line 6 and the clock bit 7 is set to be 1.5 times of an interval B between data bits 8.

The above-described clock bits 7 act to identify that the data track 4 has been shifted to another data track 4, the clock bits 7 being, as illustrated, positioned on the alternate data tracks 4 in the same band 5. Furthermore, the clock bits 7 are positioned alternately with the data tracks 4 of the neighboring bands 5.

Figure 4:
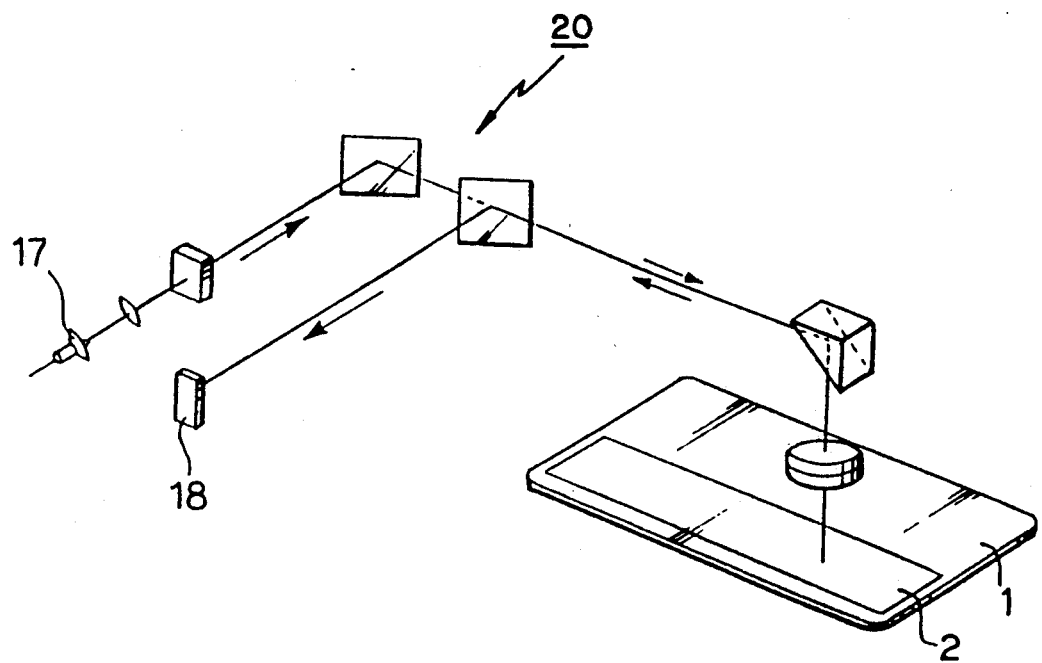
FIG. 4 illustrates the principle of an optical portion.

Then, an optical portion 20 for reading data recorded in the optical recording medium 1 shown in FIG. 3 will now be described with reference to FIG. 4.

As illustrated, the data reading operation is conducted by converging data beam, for example, infrared rays from an LED 17 so as to apply it to the optical recording medium 1 and by receiving a reflected beam by an image sensor such as a CCD line sensor 18 so that the data bits 8 formed on the surface of the optical recording medium 1 are read.

It is considered that the CCD line sensor 18 observes the data bits 8 through a slit 19 shown in FIG. 3. The slit 19 portion is scanned from left to right when viewed in the drawing so that a read signal is obtained, the read signal thus obtained representing the presence of the data bit 8 so that I/O of data is identified.

Specifically, the data reading operation is conducted by repeatedly scanning one data track 4 by a plurality of times.

Figure 1:
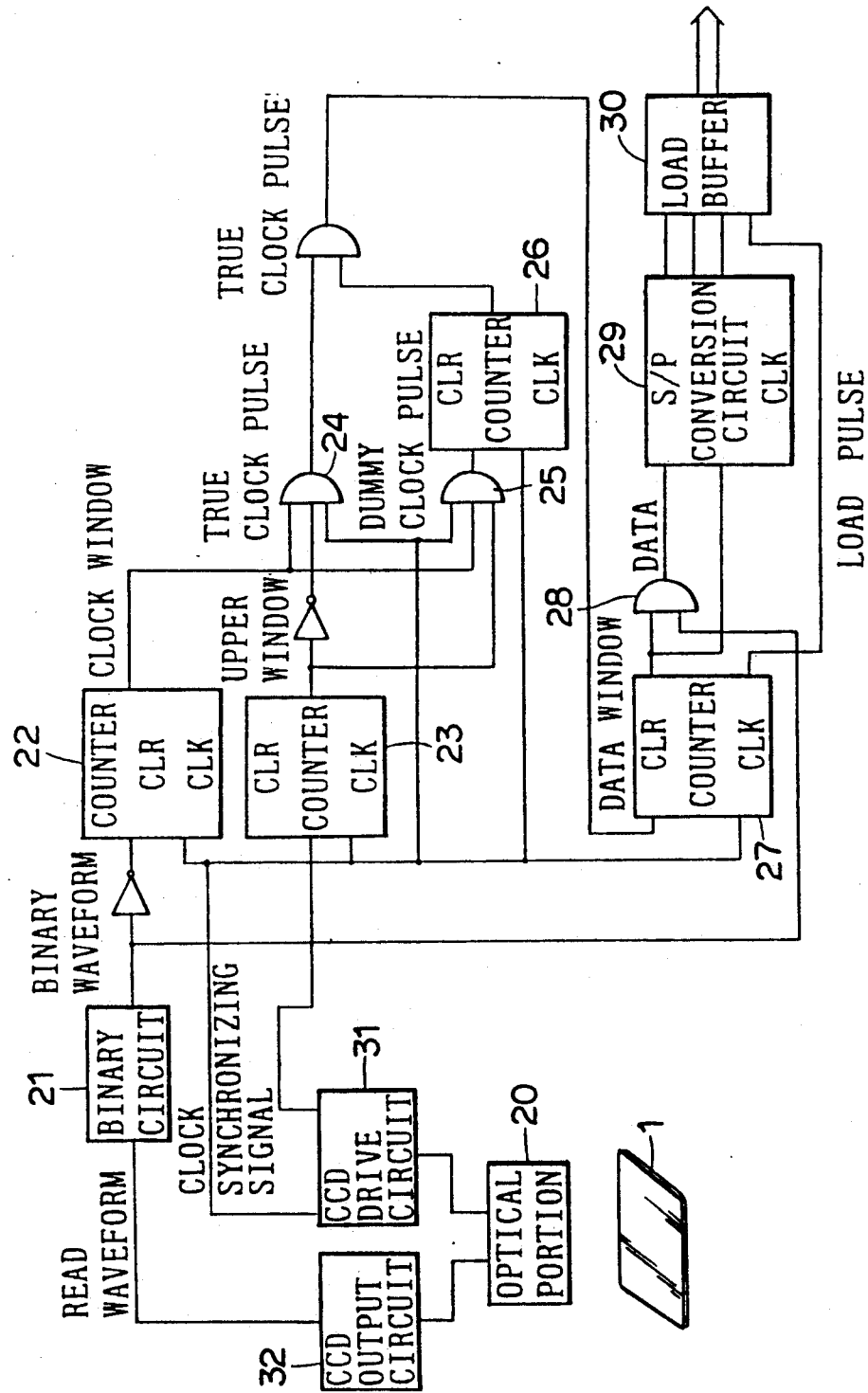
FIG. 1 is a block diagram which illustrates an embodiment of a reading system according to the present invention.

Then, a reading portion for reading the above-described optical recording medium 1 will now be described. The reading portion comprises, as shown in FIG. 1, the above-described optical portion 20, a binary circuit 21, counters 22, 23, 26 and 27, AND circuits 24, 25 and 28, a serial/parallel converting circuit 29 and a buffer 30. Referring to the drawing, reference numeral 31 represents a drive circuit for the CCD line sensor 18, and 32 represents a CCD output circuit for outputting the reading signal of the CCD line sensor 18.

The binary circuit 21 is a circuit for detecting the reading signal from the CCD output circuit 32 so as to generate a binary waveform. Check window generating means, such as the counter 22, generates clock windows at intervals A between the above-described reference line 6 and the clock bit 7 in accordance with the read signal of the above-described data track 4. The counter 23 generates an upper window which displays the difference between the present data region 2 on which the reading is being conducted and the neighboring data region 2.

The AND circuits 24 and 25 calculate the logical product of the clock window and the read signal of the clock bit 7 and generates a true clock pulse or a dummy clock pulse.

Converting means, such as counter 26, converts the dummy clock pulse into the timing of the true clock pulse in the case of the above-described dummy clock pulse. Data window generating means, such as the counter 27 generates the data windows at the same interval as those of the bits 3 on the basis of the above-described true clock pulse. The AND circuit 28 calculates the logical product of the data window and the reading signal so as to arrange the thus obtained logical product to be data.

Figure 2:
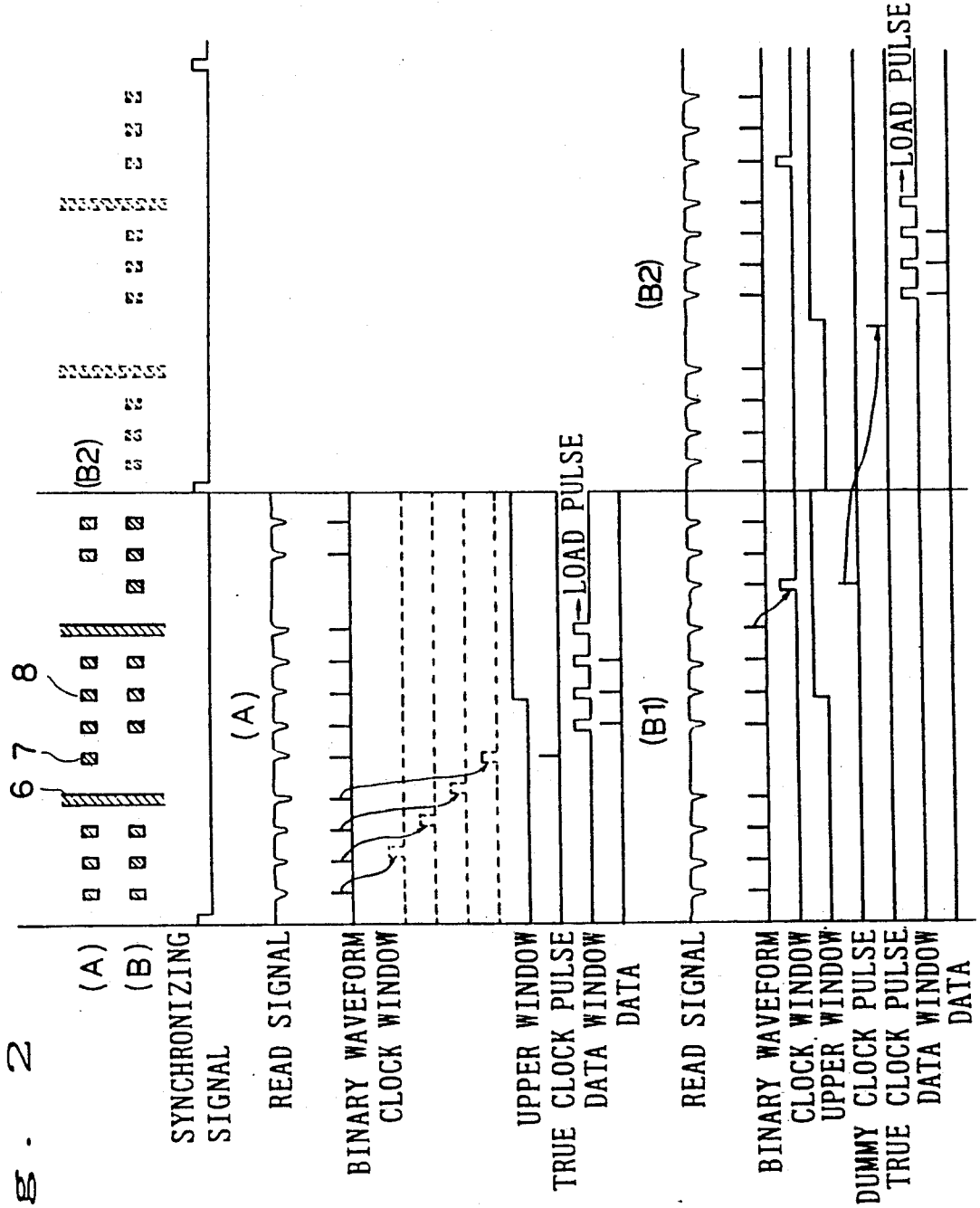
FIG. 2 is a time chart which illustrates the operation of reading an optical recording medium performed on the basis of the reading system.

Then, the operation of the above-described reading portion will now be described with reference to a time chart shown in FIG. 2.

A time chart for reading the data track 4 of column A in the optical recording medium 1 is shown in (A). A time chart for reading the data track 4 of column B at a first scanning is shown in (B1), while a time chart for reading the same at a second scanning is shown in (B2).

The peak point of the read signal of the data track 4 of the column A is detected by the binary circuit 21 so that a binary waveform is generated. The counter 22 is counted up by the clock of the CCD drive circuit 31 so that a clock window as illustrated is generated in order to clear the counter 22 for the clock window by the binary waveform and to create clock windows at every interval A. Furthermore, the counter 23 for the upper window is cleared by a synchronizing signal and is counted up by a clock so that an upper window is generated.

In the column A, the clock window and the binary waveform meets the logical product when the upper window is low. Thus, the true clock pulse is generated by the AND circuit 24. Then, the counter 27 is cleared and is counted up by the clock so that the data windows can be created at intervals A on the basis of the true clock pulse.

If there is the binary waveform in the data window, the AND circuit 28 can be met so that data can be obtained. Data thus obtained is converted into parallel data by the serial/parallel converting circuit 29 by using the data window as the clock. Then, a load pulse is outputted to the buffer 30 by the counter 27 so that data is stored.

In the data track 4 of the column B, the dummy clock pulse is generated by the AND circuit 25 since the clock window and the binary waveform meet the logical product when the upper window is high as shown in (B1). This displays a fact that the clock bit 7 exists in the data track 4 in the neighboring band 5. Therefore, the shift of the data track from the column A to the column B can be identified.

In this case, in order to arrange the dummy clock pulse to be the timing of the true clock pulse, the counter 26 is cleared and counted up by the clock. At the second scanning (after the next synchronizing signal), the true clock pulse is generated at a position corresponding to the clock bit 7 of the data track 4 of the column B. Then, the operation in which the logical product of the data window and the binary waveform is calculated and the thus obtained logical product is stored in the buffer 30 is conducted as described above.

Thus, data can be correctly read on each of the data tracks.

What is claimed is:

1. A system for reading an optical recording medium, said medium having one or more data regions formed by arranging, in parallel, a plurality of data tracks each of which is constituted by a plurality of bits along a reference line positioned perpendicular to said data tracks, said system for reading an optical recording medium comprising:
   a reading portion having a bit included in said data track positioned adjacent to said reference line and comprising a clock bit;
   clock window generating means for generating clock windows on the basis of read signals of said data track;
   an AND circuit for calculating the logical product of a clock window and a read signal of said clock bit in a data region and generating a true clock pulse or a dummy clock pulse;
   converting means for converting said dummy clock pulse into the timing of said true clock pulse in the case of said dummy clock pulse;
   data window generating means for generating data windows on the basis of said true clock, pulse; and
   an AND circuit for calculating the logical product of a data window and a read signal.

2. A system for reading an optical recording medium according to claim 1, wherein clock windows are generated at the same intervals between said reference lines and said clock bits.

3. A system for reading an optical recording medium according to claim 1, wherein data windows are generated at the same intervals between said data bits.

4. A system for reading an optical recording medium according to claim 1, wherein the intervals between said clock bits and said reference lines are different from intervals between data bits, and clock bits are formed on alternate data tracks of adjacent data regions.

5. A system for reading an optical recording medium according to claim 1, further including upper window generating means for generating an upper window for displaying the difference between a data region and a neighboring data region.

* * * * *